(12) United States Patent
Nathan et al.

(10) Patent No.: US 6,985,077 B2
(45) Date of Patent: Jan. 10, 2006

(54) METHOD OF TUNING A SENSOR ARRAY FOR OCCUPANCY SENSING IN A VEHICLE SEAT

(75) Inventors: John F. Nathan, White Lake Township, MI (US); Oliver Young, Grosse Pointe Farms, MI (US)

(73) Assignee: Lear Corporation, Southfield, MI (US)

( * ) Notice: Subject to any disclaimer, the term of this patent is extended or adjusted under 35 U.S.C. 154(b) by 123 days.

(21) Appl. No.: 10/748,357

(22) Filed: Dec. 30, 2003

(65) Prior Publication Data

US 2005/0149284 A1 Jul. 7, 2005

(51) Int. Cl.
*B60R 22/00* (2006.01)
*B60R 21/32* (2006.01)
*G01L 25/00* (2006.01)

(52) U.S. Cl. .............................. 340/457.1; 340/573.1; 340/573.7; 701/45; 280/735; 73/1.13

(58) Field of Classification Search ............. 340/457.1, 340/626; 701/45; 73/1.57–1.64
See application file for complete search history.

(56) References Cited

U.S. PATENT DOCUMENTS

| | | | |
|---|---|---|---|
| 5,377,108 A | 12/1994 | Nishio | 364/424.05 |
| 5,404,128 A | 4/1995 | Ogino et al. | 340/425.5 |
| 5,413,378 A | 5/1995 | Steffens, Jr. et al. | 280/735 |
| 5,474,327 A | 12/1995 | Schousek | 280/735 |
| 5,485,000 A | 1/1996 | Schneider | 235/494 |
| 5,570,903 A | 11/1996 | Meister et al. | 280/735 |
| 5,583,771 A | 12/1996 | Lynch et al. | 364/424.045 |
| 5,594,222 A | 1/1997 | Caldwell | 200/600 |
| 5,653,462 A | 8/1997 | Breed et al. | 280/735 |
| 5,684,701 A | 11/1997 | Breed | 364/424.055 |
| 5,694,320 A | 12/1997 | Breed | 364/424.055 |
| 5,731,781 A | 3/1998 | Reed | 342/135 |
| 5,739,757 A | 4/1998 | Gioutsos | 340/667 |
| 5,748,473 A | 5/1998 | Breed et al. | 364/424.055 |
| 5,810,392 A | 9/1998 | Gagnon | 280/735 |
| 5,822,707 A | 10/1998 | Breed et al. | 701/49 |
| 5,829,782 A | 11/1998 | Breed et al. | 280/735 |
| 5,835,613 A | 11/1998 | Breed et al. | 382/100 |
| 5,848,802 A | 12/1998 | Breed et al. | 280/735 |
| 5,877,677 A | 3/1999 | Fleming et al. | 340/436 |

(Continued)

FOREIGN PATENT DOCUMENTS

EP 0 689 967 A1 3/1996

(Continued)

*Primary Examiner*—Jeffery Hofsass
*Assistant Examiner*—Anne V. Lai
(74) *Attorney, Agent, or Firm*—Bill Panagos; Bliss McGlynn, P.C.

(57) ABSTRACT

A method of tuning the output of a sensor array for a vehicle seat occupancy sensing system that is used with a neural net for occupancy classification. The method includes the step of pressing a series of seat cushion body pressure distribution forms in a series of predetermined seating positions into a particular vehicle seat to produce a series of representative sensor response patterns from the sensor array. The method also includes the steps of comparing each sensor response pattern through the neural net and determining if any of the determined sensor patterns are indistinguishable, and then determining which sensors were deflected and the amount of deflection in those sensors for the indistinguishable sensor response patterns. The method steps further include adjusting the biasing of said sensors to cause said indistinguishable patterns to diverge and be distinguishable by the neural net and repeating the above steps until the senor response patterns are distinguishable from one another.

10 Claims, 4 Drawing Sheets

U.S. PATENT DOCUMENTS

| | | | |
|---|---|---|---|
| 5,890,758 A | 4/1999 | Pone et al. | 297/15 |
| 5,901,978 A | 5/1999 | Breed et al. | 280/735 |
| 5,916,180 A * | 6/1999 | Cundari et al. | 600/587 |
| 5,931,254 A | 8/1999 | Loraas et al. | 180/272 |
| 5,931,527 A | 8/1999 | D'Onofrio et al. | 297/146 |
| 5,943,295 A | 8/1999 | Varga et al. | 367/99 |
| 5,954,398 A | 9/1999 | Namba et al. | 297/257 |
| 5,971,432 A | 10/1999 | Gagnon et al. | 280/735 |
| 5,975,612 A | 11/1999 | Macey et al. | 296/66 |
| 6,012,007 A | 1/2000 | Fortune et al. | 701/45 |
| 6,020,812 A | 2/2000 | Thompson et al. | 340/438 |
| 6,027,138 A | 2/2000 | Tanaka et al. | 280/735 |
| 6,030,038 A | 2/2000 | Namba et al. | 297/257 |
| 6,039,139 A | 3/2000 | Breed et al. | 180/271 |
| 6,043,743 A | 3/2000 | Saito et al. | 340/562 |
| 6,045,405 A | 4/2000 | Geltsch et al. | 439/620 |
| 6,056,079 A | 5/2000 | Cech et al. | 180/273 |
| 6,059,358 A | 5/2000 | Demick et al. | 297/188.04 |
| 6,078,854 A | 6/2000 | Breed et al. | 701/49 |
| 6,079,763 A | 6/2000 | Clemente | 296/65.05 |
| 6,081,757 A | 6/2000 | Breed et al. | 701/45 |
| 6,088,640 A | 7/2000 | Breed | 701/45 |
| 6,089,641 A | 7/2000 | Mattarella et al. | 296/64 |
| 6,101,436 A | 8/2000 | Fortune et al. | 701/45 |
| 6,102,463 A | 8/2000 | Swanson et al. | 296/37.15 |
| 6,116,639 A | 9/2000 | Breed et al. | 280/735 |
| 6,129,168 A | 10/2000 | Lotito et al. | 180/273 |
| 6,129,404 A | 10/2000 | Mattarella et al. | 296/65.09 |
| 6,134,492 A | 10/2000 | Breed et al. | 701/49 |
| 6,138,067 A | 10/2000 | Cobb et al. | 701/45 |
| 6,141,432 A | 10/2000 | Breed et al. | 382/100 |
| 6,168,198 B1 | 1/2001 | Breed et al. | 280/735 |
| 6,186,537 B1 | 2/2001 | Breed et al. | 280/735 |
| 6,220,627 B1 | 4/2001 | Stanley | 280/735 |
| 6,234,519 B1 | 5/2001 | Breed | 280/735 |
| 6,234,520 B1 | 5/2001 | Breed et al. | 280/735 |
| 6,242,701 B1 | 6/2001 | Breed et al. | 177/144 |
| 6,250,671 B1 | 6/2001 | Osmer et al. | 280/735 |
| 6,250,672 B1 | 6/2001 | Ryan et al. | 280/735 |
| 6,253,134 B1 | 6/2001 | Breed et al. | 701/49 |
| RE37,260 E | 7/2001 | Varga et al. | 367/99 |
| 6,254,127 B1 | 7/2001 | Breed et al. | 280/735 |
| 6,270,116 B1 | 8/2001 | Breed et al. | 280/735 |
| 6,279,946 B1 | 8/2001 | Johnson et al. | 280/734 |
| 6,283,503 B1 | 9/2001 | Breed et al. | 280/735 |
| 6,323,444 B1 | 11/2001 | Aoki | 177/144 |
| 6,324,453 B1 | 11/2001 | Breed et al. | 701/45 |
| 6,325,414 B2 | 12/2001 | Breed et al. | 280/735 |
| 6,330,501 B1 | 12/2001 | Breed et al. | 701/49 |
| 6,342,683 B1 | 1/2002 | Aoki et al. | 177/144 |
| 6,353,394 B1 | 3/2002 | Maeda et al. | 340/667 |
| 6,393,133 B1 | 5/2002 | Breed et al. | 382/100 |
| 6,394,490 B2 | 5/2002 | Osmer et al. | 280/735 |
| 6,397,136 B1 | 5/2002 | Breed et al. | 701/45 |
| 6,407,347 B1 | 6/2002 | Blakesley | 177/144 |
| 6,412,813 B1 | 7/2002 | Breed et al. | 280/735 |
| 6,416,080 B1 | 7/2002 | Gillis et al. | 280/735 |
| 6,422,595 B1 | 7/2002 | Breed et al. | 280/735 |
| 6,442,465 B2 | 8/2002 | Breed et al. | 701/45 |
| 6,442,504 B1 | 8/2002 | Breed et al. | 702/173 |
| 6,445,988 B1 | 9/2002 | Breed et al. | 701/45 |
| 6,452,870 B1 | 9/2002 | Breed et al. | 367/99 |
| 6,457,545 B1 | 10/2002 | Michaud et al. | 180/272 |
| 6,474,739 B1 | 11/2002 | Lagerweij | 297/341 |
| 6,476,514 B1 | 11/2002 | Schondorf | 307/10.1 |
| 6,505,522 B1 * | 1/2003 | Wilssens | 73/862.51 |
| 6,506,069 B2 | 1/2003 | Babala et al. | 439/248 |
| 6,532,408 B1 | 3/2003 | Breed | 701/45 |
| 6,605,877 B1 | 8/2003 | Patterson et al. | 307/10.1 |
| 6,609,054 B2 * | 8/2003 | Wallace | 701/45 |
| 6,615,122 B1 | 9/2003 | Yamashita | 701/45 |
| 6,771,175 B1 * | 8/2004 | Eagle et al. | 340/573.1 |
| 2002/0003345 A1 | 1/2002 | Stanley et al. | 280/735 |
| 2002/0056975 A1 | 5/2002 | Yoon et al. | 280/735 |
| 2002/0079728 A1 | 6/2002 | Tame | 297/344.1 |
| 2002/0098730 A1 | 7/2002 | Babala et al. | 439/248 |
| 2002/0195807 A1 | 12/2002 | Ishida | 280/735 |
| 2003/0040858 A1 | 2/2003 | Wallace | 701/45 |
| 2003/0071479 A1 | 4/2003 | Schaller et al. | 296/136 |
| 2003/0090133 A1 | 5/2003 | Nathan et al. | 297/217.3 |
| 2003/0106723 A1 | 6/2003 | Thakur et al. | 177/144 |
| 2003/0111276 A1 | 6/2003 | Kajiyama | 177/144 |
| 2003/0164715 A1 | 9/2003 | Lester | 324/661 |
| 2003/0171036 A1 | 9/2003 | Aujla et al. | 439/660 |
| 2003/0189362 A1 | 10/2003 | Lichtinger et al. | 297/217.3 |
| 2003/0196495 A1 | 10/2003 | Saunders et al. | 73/862.041 |
| 2003/0220766 A1 | 11/2003 | Saunders et al. | 702/173 |
| 2004/0154375 A1 * | 8/2004 | Mattes et al. | 73/1.08 |

FOREIGN PATENT DOCUMENTS

| | | |
|---|---|---|
| WO | WO 98/41424 | 3/1997 |

* cited by examiner

METHOD OF TUNING A SENSOR ARRAY FOR OCCUPANCY SENSING IN A VEHICLE SEAT

BACKGROUND OF THE INVENTION

1. Field of the Invention

The present invention relates, generally to the tuning of a sensor array and, more specifically, to a method for tuning a sensor array used to sense the occupancy of a vehicle seat as part of a supplemental restraint system.

2. Description of the Related Art

Automotive vehicles employ seating systems that accommodate the passengers of the vehicle. The seating systems include restraint systems that are calculated to restrain and protect the occupants in the event of a collision. The primary restraint system commonly employed in most vehicles today is the seatbelt. Seatbelts usually include a lap belt and a shoulder belt that extends diagonally across the occupant's torso from one end of the lap belt to a mounting structure located proximate to the occupant's opposite shoulder.

In addition, automotive vehicles may include supplemental restraint systems. The most common supplemental restraint system employed in automotive vehicles today is the inflatable airbag. In the event of a collision, the airbags are deployed as an additional means of restraining and protecting the occupants of the vehicle. Originally, the supplemental inflatable restraints (airbags) were deployed in the event of a collision whether or not any given seat was occupied. These supplemental inflatable restraints and their associated deployment systems are expensive and over time this deployment strategy was deemed not to be cost effective. Thus, there became a recognized need in the art for a means to selectively control the deployment of the airbags such that deployment occurs only when the seat is occupied.

Partially in response to this need, vehicle safety systems have been proposed that include vehicle occupant sensing systems capable of detecting whether or not a given seat is occupied. The systems act as a switch in controlling the deployment of a corresponding air bag. As such, if the occupant sensing device detects that a seat is unoccupied during a collision, it can prevent the corresponding air bag from deploying, thereby saving the vehicle owner the unnecessary cost of replacing the expended air bag.

Furthermore, many airbag deployment forces and speeds have generally been optimized to restrain one hundred eighty pound males because the one hundred eighty pound male represents the mean average for all types of vehicle occupants. However, the airbag deployment force and speed required to restrain a one hundred eighty pound male exceeds that which are required to restrain smaller occupants, such as some females and small children. Thus, there became a recognized need in the art for occupant sensing systems that could be used to selectively control the deployment of the airbags when a person below a predetermined weight occupies the seat.

Accordingly, other vehicle safety systems have been proposed that are capable of detecting the weight of an occupant. In one such air bag system, if the occupant's weight falls below a predetermined level, then the system can suppress the inflation of the air bag or will prevent the air bag from deploying at all. This reduces the risk of injury that the inflating air bag could otherwise cause to the smaller-sized occupant.

Also, many airbag deployment forces and speeds have generally been optimized to restrain a person sitting generally upright towards the back of the seat. However, the airbag deployment force and speed may inappropriately restrain a person sitting otherwise. Thus, there became a recognized need in the art for a way to selectively control the deployment of an airbag depending on the occupant's sitting position.

Partially in response to this need, other vehicle safety systems have been proposed that are capable of detecting the position of an occupant within a seat. For example, if the system detects that the occupant is positioned toward the front of the seat, the system will suppress the inflation of the air bag or will prevent the air bag from deploying at all. This reduces the risk of injury that the inflating air bag could otherwise cause to the occupant. It can be appreciated that these occupant sensing systems provide valuable data, allowing the vehicle safety systems to function more effectively to reduce injuries to vehicle occupants.

One necessary component of each of the known systems discussed above includes some means for sensing the presence of the vehicle occupant in the seat. One such means may include a sensor device supported within the lower seat cushion of the vehicle seat. For example, U.S. published patent application having U.S. Ser. No. 10/249,527 and Publication No. US2003/0196495 A1 filed in the name of Saunders et al. discloses a method and apparatus for sensing seat occupancy including a sensor/emitter pair that is supported within a preassembled one-piece cylinder-shaped housing. The housing is adapted to be mounted within a hole formed in the seat cushion and extending from the B-surface toward the A-surface of the seat cushion. The sensor/emitter pair supported in the housing includes an emitter that is mounted within the seat cushion and spaced below the upper or A-surface of the seat cushion. In addition, the sensor is also supported by the housing within the seat cushion but spaced below the emitter. The cylindrical housing is formed of a compressible, rubber-like material that is responsive to loads placed on the upper surface of the seat cushion. The housing compresses in response to a load on the seat cushion. The load is detected through movement of the emitter toward the sensor as the housing is compressed. The housing is sufficiently resilient to restore the emitter to full height when no load is applied to the upper surface of the seat cushion. The Saunders et al. system also includes a processor for receiving the sensor signals and interpreting the signals to produce an output to indicate the presence of an occupant in the seat.

Additionally, a number of occupancy sensing systems known in the related art teach the use of sensing processes that employ artificial neural networks (ANN). ANNs are more commonly referred to as neural networks, or simply, neural nets. The term neural net (NN) is in fact a broad term that includes many diverse models and approaches. However, the basic structure of all NNs draw a loose analogy to the parallel interconnectivity of the neurons of the human brain. In general terms, a NN is essentially an interconnected assembly of simple processing element units, or nodes. The processing ability of the network is stored in the inter-unit connection strengths, or weights, obtained by a process of adaptation to, or learning from, a set of training patterns. The NN may simply have an input and an output layer of units, or have an additional "hidden" layer or layers of units that internally direct the interconnection processes. The benefit of employing a NN approach is that, if properly trained, the NN will be able to generalize and infer the correct output responses from limited input data. This not only allows the NN based occupancy sensing systems to comply with the current federal standards, but may also allow these systems to be refined to extend their capabilities to distinguish between a wide variety of occupants seated in a variety of positions.

Generally speaking, if it is desired to use a NN to produce particular results from a variety of possible inputs, the NN must first be trained to understand the data it will receive. In this case, the NN is provided an input and the desired result. This training process is known as "supervised learning." Supervised learning may be applied to a number of different known types of NNs, but when used for pattern recognition, as in determining the occupancy of a vehicle seat, a "clustering" type of NN is more accurate and efficient. Clustering NNs develop a set of "codebook vectors" that define a set of output clusters or classes. During the training of a clustering NN, the NN defines and "learns" the boundaries between its established clusters. The NN employs a "learning" rule whereby the weights of the unit connections are adjusted on the basis of the training data. The learning rule is essentially the algorithm used in the NN that will be the basis for deciding how to classifying the actual incoming data, once the training is completed and the NN is put into use.

For a clustering NN to perform pattern recognition and classification of a physical presence that occupies a vehicle seat, a group of sensors arranged in an array are used to collect the raw input data. Since NNs operate digitally and the data derived from the sensor array is analog, the data must be converted to a representative digital signal for input to the NN. A number of the prior art patents disclose various ways in which the sensor data of the array is preprocessed. Typically, extensive filtering is required to compensate for shortcomings in the array or prepare the data to work with the particular type of NN that is employed.

Regardless of the types of sensors or the types of NNs employed, it is important to note that the prior art systems do not individually tune or align the sensors in relation to the entire array. Some simply take the data as derived from the sensor array and preprocess it in a way to attempt to make the most sense of the information. One or two other prior systems suggest changing the number of sensors in the array to control the data. Also, none of the prior art systems perform a specific physical tuning process to the sensors of the array so that the data output from the sensors collectively represent clear and distinct patterns for each of the different types of predetermined classifications. Tuning of the sensors by changing their individual biasing and thus their responsiveness, especially when using mechanically biased sensors such as a Hall effect type pressure sensor, is critical to providing a detectable separation between the various weights placed on the sensor array. Some of the prior art systems utilize sensors in an array that are specified to have a range of deflection that represents particular weights. However, without tuning the sensor array to distinguish between the various types of inputs to be received in the form of specific deflection patterns, the sensor array will provide overlapping results. This overlapping of sensor data muddles the distinction of one pattern from another in certain weight ranges. This results in inaccurate interpretation of the sensor data and possible mis-classification of the occupant.

A tuning process that adjusts the responsiveness of the sensors in an array would clarify the sensor array output, so that the need for preprocess filtering would be greatly reduced or eliminated. Further, a properly tuned sensor array would provide output data that would be inherently more reliable as a much greater number of weight pressure patterns could be distinguished. Accordingly, there remains a need in the art for a method of tuning the individual sensors in a sensor array and the array as a whole for pattern recognition and occupant classification in a vehicle seat.

SUMMARY OF THE INVENTION

The disadvantages of the related art are overcome by the method of the present invention for tuning the output of a sensor array for a vehicle seat that is used with a neural net for occupancy classification. The method includes the step of pressing a series of seat cushion body pressure distribution forms in a series of predetermined seating positions into a particular vehicle seat to determine a series of representative sensor response patterns from the sensor array. The method also includes the steps of comparing each sensor response pattern and determining if any of the determined sensor patterns are indistinguishable by the neural net, and then determining which sensors were deflected and the amount of deflection in those sensors for the indistinguishable sensor response patterns. The method steps further include adjusting the biasing of said sensors to cause said indistinguishable patterns to diverge and be distinguishable by the neural net and repeating the above steps until the senor response patterns are distinguishable from one another.

Thus, with an sensor array tuned by the method of the present invention, the neural net of the vehicle seat occupancy sensing system will be operationally capable of distinctly determining a physical presence in a vehicle seat as belonging to a particular occupancy classification regardless of its seating position in the seat. Accordingly, the present invention overcomes the limitations of the current methods of by providing a tuning method for a sensor array used with a neural net in an vehicle seat occupancy sensing system that allows the neural net to distinguish between all the various occupant classification and their placement in the seat.

Other objects, features and advantages of the present invention will be readily appreciated as the same becomes better understood after reading the subsequent description taken in connection with the accompanying drawings.

DETAILED DESCRIPTION OF THE PREFERRED EMBODIMENT(S)

Figure 1:
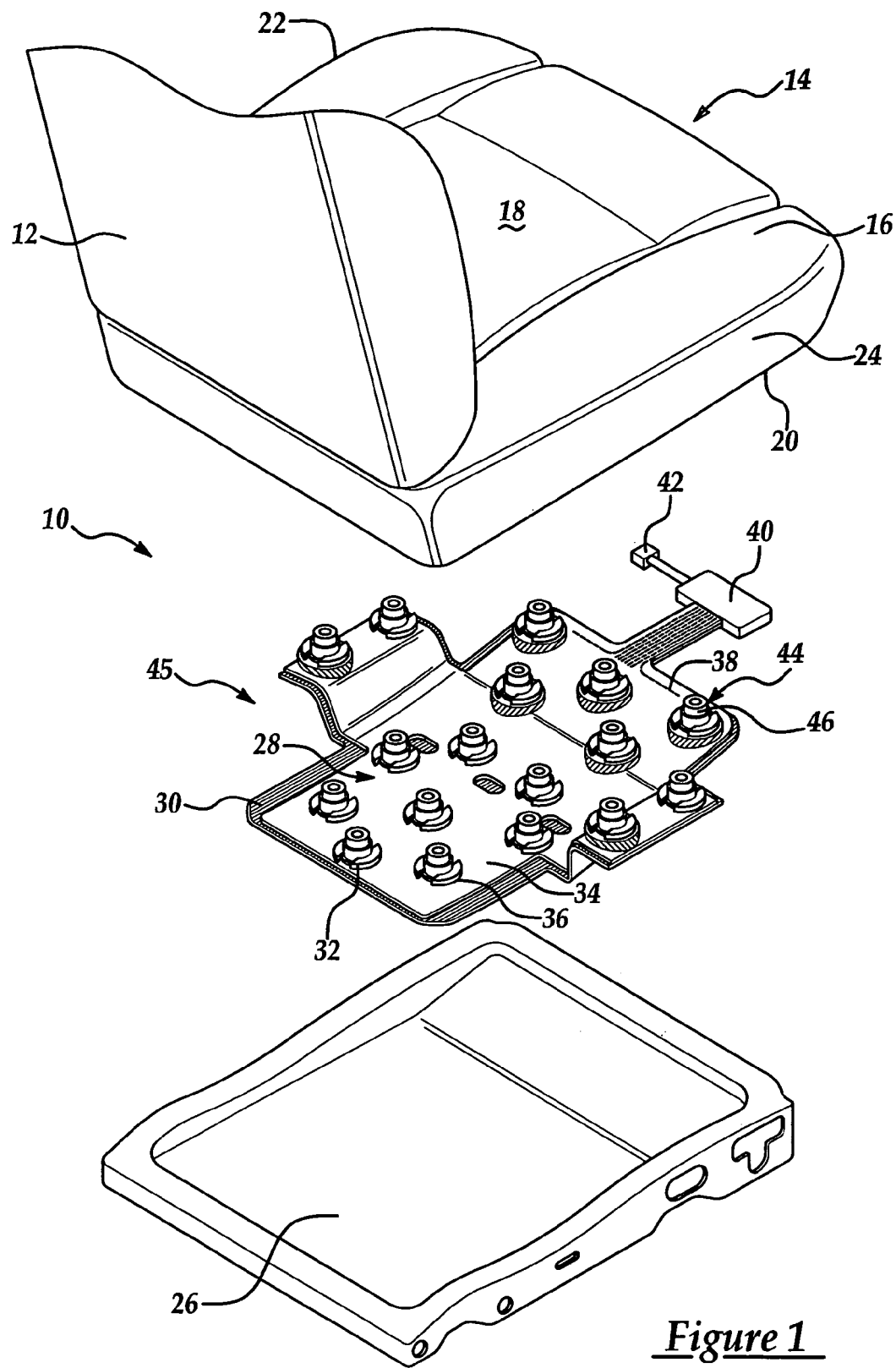
FIG. 1 is an exploded view of a vehicle seat having a sensor array of the type that may be tuned by the method of the present invention.

Referring now to the drawings, where like numerals are used to designate like structure throughout the figures, an exploded view of one example of a vehicle seat assembly having an occupancy sensing system that may be employed with the method of the present invention is generally indicated at 10 in FIG. 1. The vehicle seat assembly 10 includes a seat back, generally indicated at 12, and a lower seat assembly, generally indicated at 14. The lower seat assembly 14 has a seat cushion 16 that defines an upper surface 18, and a lower surface 20 that is spaced from the upper surface 18. The upper surface 18 of the seat cushion 16 maybe referred to as the "A-surface" and the lower surface 20 may be referred to as the "B-surface." The seat cushion 16 also defines an inboard side 22 and an outboard side 24. When an occupant (not shown) is supported on the lower seat assembly 14, the weight of the occupant will apply an axial load directed generally through the upper surface 18 of the seat cushion 16 toward the lower surface 20. Although the weight of the occupant will induce an axial as well as shear forces in the seat cushion 16, those having ordinary skill in the art will recognize that the primary load path of the occupant's weight will be substantially vertical from the upper surface 18 toward the lower surface 20, through the seat cushion 16.

The lower seat assembly 14 also includes a seat pan, generally indicated at 26. The seat pan 26 is generally disposed beneath the lower surface 18 so as to support the seat cushion 16. In turn, the seat pan 26 is operatively supported relative to the floor of the vehicle using any suitable structure of the type commonly known in the art, such as a seat track (not shown). In addition, the vehicle seat assembly 10 includes a vehicle occupant sensing system, generally indicated at 28. The vehicle occupant sensing system 28 is used for detecting a condition of the vehicle seat assembly 10, such as whether or not the vehicle seat assembly 10 is occupied, the size and weight classification of the occupant, or whether the occupant is sitting in a certain position.

The occupant sensing system 28 includes a circuit carrier tray, generally indicated at 30, that is supported by the seat pan 26. The circuit carrier tray 30 includes a plurality of resilient attachment tabs 32 extending upward toward the lower surface 20 of the lower seat cushion 16. Each attachment tab 32 is shaped like a partial ring that extends upward from the tray 30. In the preferred embodiment illustrated in FIG. 1, the attachment tabs 32 are arranged into mirror-image pairs spaced intermittently about the tray 30. The tray 30 supports components of the vehicle occupant sensing system 28 as will be described in greater detail below.

The occupant sensing system 28 also includes a circuit carrier 34, which is disposed adjacent the lower surface 20 of the seat cushion 16. The tray 30 supports the circuit carrier 34, and the circuit carrier 34 includes a plurality of cutouts 36 each having a shape corresponding to the shape of the attachment tabs 32 of the tray 30 such that the tabs 32 can extend upward through the circuit carrier 34.

The occupant sensing system 28 also includes an electric circuit 38, which is supported by the circuit carrier 34. Specifically, the circuit carrier 34 is made of a thin nonconductive and corrosion-resistant material, and it encapsulates known electrical components that form the electric circuit 38. For instance, in one embodiment, a flexible printed circuit forms the circuit carrier 34 and electric circuit 38. The circuit 38 is electrically connected to a controller schematically illustrated at 40. The electric circuit 38 carries electric signals generated by the vehicle occupant sensing system 28 to the controller 40. The controller 40 is electrically attached to a restraint system, schematically illustrated at 42. The restraint system 42 can be of many types, such as an air bag system, and the controller 40 sends an output to the restraint system 42 based on the signals delivered by the electric circuit 38. Although an airbag restraint system is discussed here, one having ordinary skill in the art will recognize that the type of restraint system 42 connected to the controller 40 does not limit the scope of the method of the present invention.

The occupant sensing system 28 shown in this example also includes a plurality of sensor assemblies generally indicated at 44 that are supported by the tray 30, below the lower surface 20 of the seat cushion 16. This plurality of sensor assemblies 44 collectively define a sensor array that is generally indicated at 45. As will be discussed in greater detail below, the particular sensor assemblies 44 shown herein have a relatively low profile and can collapse in a more compact manner than similar sensor assemblies of the prior art. Advantageously, these low profile sensor assemblies 44 allow an occupant to sit more comfortably upon the vehicle seat 10.

Figure 2:
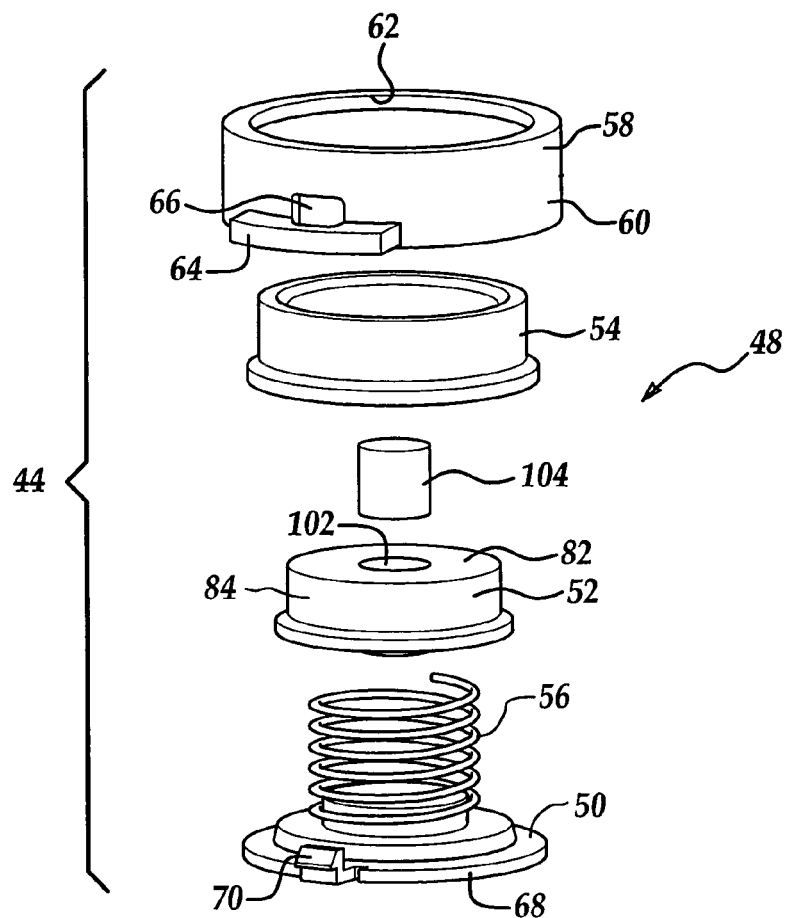
FIG. 2 is an exploded view of a sensor of the type that may be employed with the sensor array of FIG. 1 and tuned by the method of the present invention.

A sensor, generally indicated at 46, is operatively fixed relative to each of the low profile sensor assemblies 32. The sensor 46 is in electrical communication with the electric circuit 38. One example of a low profile sensor assembly that may be employed with the method of the present invention is shown in greater detail in FIGS. 2 and 3. The low profile sensor assembly 44 generally includes a housing 48, having a base 50, an upper slide member 52, an intermediate guide member 54, and a base guide 58. The intermediate guide member 54 is disposed between the upper slide member 52 and the base 50. The upper slide member 52 and the intermediate guide member 54 are both supported for movement toward and away from the base 50. A biasing member 56 acts to bias the upper slide member 52 and intermediate guide member 54 away from the base 50.

The base guide 58 is shaped like a hollow tube so as to define a wall 60 with a bore 62 extending axially therethrough to allow for axial movement of the intermediate guide member 54. The base 50 also includes a retainer portion 68, which is substantially disc-shaped and is attached to one terminal end of the base guide 58. Two resilient tabs 70 extend radially and upward from an outer circumferential edge of the retainer portion 68. The tabs 70 are spaced 180° apart from each other. To connect the retainer portion 68 and the base guide 58, the retainer 68 moves axially into the bore 62 of the base guide 58 such that the tabs 70 of the retainer 68 snap into the apertures 66 of the base guide 58.

Figure 3:
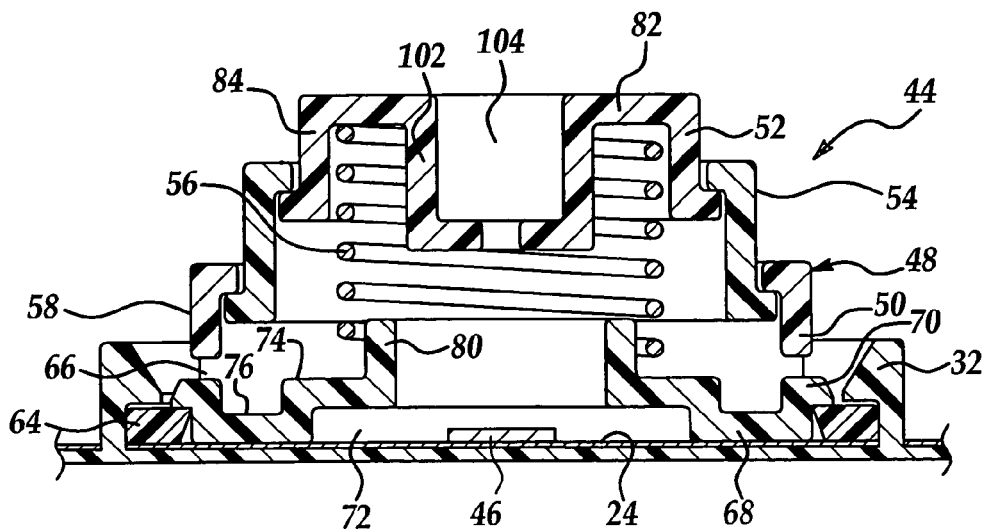
FIG. 3 is a cross-sectional view of the sensor of FIG. 2 that may be employed with the sensor array of FIG. 1 and tuned by the method of the present invention.
Figure 4:
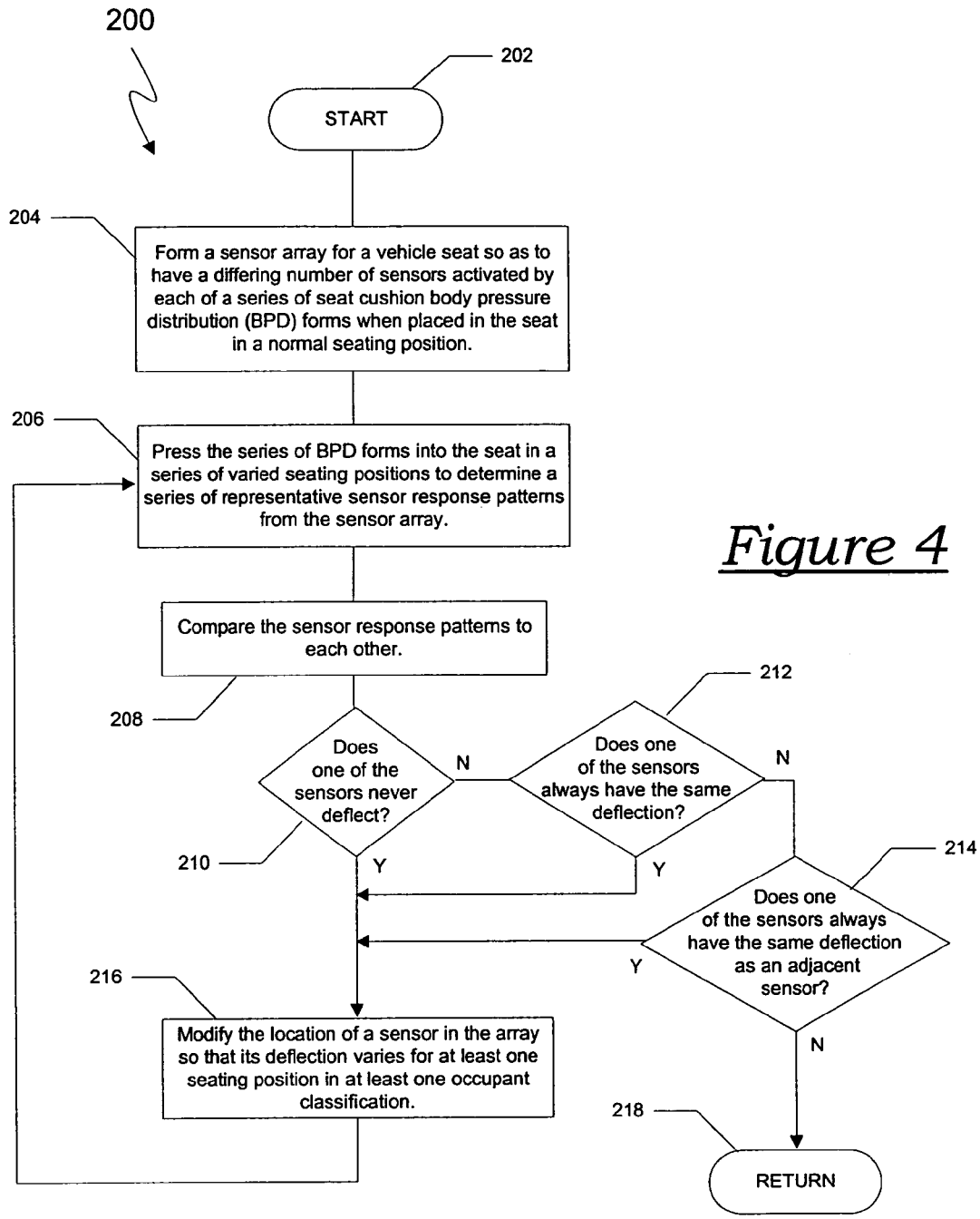
FIG. 4 is a block diagram flowchart of the method of the present invention for tuning the alignment of the sensors of the sensor array for a vehicle seat that is used with a neural net for occupancy classification.

The upper slide member 52 includes an upper disc portion 82 and a support wall 84 extending axially downward from the outer circumference of the upper disc portion 82. The support wall 84 has a smaller diameter than the diameter of the intermediate guide member 54 such that the upper slide member 52 can move axially through the intermediate guide member 54. The biasing member 56 is disposed between the inner platform 78 of the base 50 and the upper disc portion 82 of the upper slide member 52. As shown in FIG. 3, the base 50 can be attached to the annular attachment tabs 32 that extend upwardly from the tray 30. Specifically, the hold-down flanges 64 of the base guide 58 can be positioned under the annular attachment tabs 32 of the tray 30 such that the annular attachment tabs 32 retain the hold-down flanges 64. To attach the base 50 to the tray 30, the bottom surface of the base 50 is positioned on the tray 30 such that the hold-down flanges 64 and the annular attachment tabs 32 are not aligned. Then, the base 50 is rotated about its axis until the hold-down flanges 64 move completely under the annular attachment tabs 32.

An annular void 72 is formed near the axial center of the base 50. As shown in FIG. 3, the sensor 46 is a Hall effect sensor attached to the circuit carrier 34 between each pair of tabs 32 of the tray 30. The upper disc portion 82 of the upper slide member 52 includes a retainer portion 102 that accepts and retains an emitter 104, such as a magnet. The magnet thereby moves in axial relationship to the sensor 46 that is disposed upon and in electrical communication with the electric circuit 38. Thus, the weight of an occupant will deform the seat cushion 16 such that the lower surface 20 of the lower seat cushion 16 pushes the upper slide member 52 toward the base 50. As the upper slide member 52 moves, the sensor 46 detects an increase in magnetic flux density generated by the approaching emitter 104. In this way, the sensor 46 is operable to detect movement of the upper slide member 52 toward and away from the base 50. In turn, the sensor 46 generates a responsive signal indicative of the increase in flux density, and the controller 40 controls the restraint system 42 based on these signals. The example of a sensor assembly 44 is described in greater detail in applicant's co-pending application, Ser. No. 11/139,722, entitled "Vehicle Occupant Sensing System Having A Low Profile Sensor Assembly," which is hereby incorporated in its entirety by reference. The electrical attachment between the sensor 46 and the circuit carrier 34 can be accomplished in the manner described in applicant's co-pending application, Ser. No. 10/748,514, entitled "Vehicle Occupant Sensing System and Method of Electrically Attaching a Sensor to an Electrical Circuit," which is hereby incorporated in its entirety by reference.

In this manner, the sensor array assembly 45, through the combined output of the sensors 46 forms a portion of a vehicle seat occupancy sensing system that is associated with the supplemental restrain system (SRS) 42. The sensor array 45 is utilized to provide data to the controller 40, which in turn sends an output to the SRS control system. The SRS control system may employ a neural net (NN) to process the sensor array data. In this case, the SRS control system uses the pattern generated by the sensor array 45, based on the occupancy of the vehicle seats as recognized by the NN, to activate or suppress the deployment of the airbags. More specifically, when a physical presence occupies the vehicle seat, the collective sensor outputs of the sensors 46 in the sensor array 45 produce a particular pattern that the NN recognizes as belonging to a certain group of patterns (i.e. a cluster or classification). If the pattern is one that falls into a classification that it has been predetermined that it is desirable to deploy the airbag in the event of an impact, the SRS control system will be prepared to do so. If the pattern is one that falls into a classification that it has been predetermined that it is not desirable to deploy the airbag in the event of an impact, the SRS control system will take steps to suppress the deployment. Furthermore, the classification of the recognized pattern also provides the SRS control system with the capability to control the rate and percentage of airbag deployment if the SRS system is so designed. It should be appreciated that aside from tuning the sensor array 45 to produce distinguishable patterns for the NN to recognize, both the NN and the SRS control system are beyond the scope of this application. It should be further appreciated that the basic classifications of occupants used herein are those established in the industry through governmental regulation, and that the present invention is not limited only to those class distinctions but is fully capable of identifying and distinguishing a far greater separation of occupant classes as may be required in the future.

It is only necessary to perform the tuning of the sensor array 45 in the preproduction stages of the build-up of the seat. Once a particular sensor array is tuned to work within the seat cushion design of the particular seat and with the NN of the SRS control system, the tuning will remain the same for each production seat. Thus, the tuned sensor array 45 can simply be physically replicated and enter into mass production with the seat. Additionally, even if the seat is used in a number of different vehicle platforms, it is not necessary to repetitively re-tune the array. The sensor array 45 is tuned in two stages. First, the positioning, or alignment of the sensors in the sensor array 45 must be tuned for sensor activation. Secondly, the output of the sensor array 45 is then tuned to ensure pattern separation.

The method of the present invention is employed to tune the alignment of the sensor assemblies 44 on the electric circuit assembly 38, and is generally indicated at 200 in FIG. 3. The method is initiated at the start entry block 202. Process block 204 then provides the step of forming a sensor array 45. The sensor array 45 is first formed by arranging the plurality of sensor assemblies 44 under the seat cushion form. It should be appreciated that the initial choice of a particular number of sensor assemblies 44 is somewhat arbitrary and will differ depending on the size of the seat or on other physical properties inherent in the seat components. It should also be appreciated that, as will be discussed below, the method of the present invention will assist the seat designer/tuner to determine if additional sensors are needed to properly detect and identify the set occupancy or if some sensors are redundant.

The initial construction of the sensor array at process step 204 requires that after the sensor assemblies 44 are placed and the seat is preliminarily constructed, a series seat cushion body pressure distribution forms are pressed into the seat in the normal seating position while the responses of the sensor assemblies are monitored. It should be appreciated that there exist standardized physical forms known as seat cushion body pressure distribution (BPD) forms that are used to represent the displacement of various classifications of passengers in a seat. These forms have the accepted physical dimensions of a representative human form for each predetermined classification and are constructed such that the weight distribution and weight density across the form are accurate. These are the BPD forms used in the discussion of this invention. It should be further appreciated that the sensor assemblies 44 are not placed in the array in a traditional grid pattern but are placed in a more "randomized" arrangement. The randomized placement arrangement is chosen as it has been empirically shown that sensor assemblies 44 in a randomized array can more readily identify "out-of-position" occupants or specific objects having defined edges such as child seats than a grid sensor arrangement.

In process step 204, as the varying BPD forms are pressed into the seat, each cause a differing number of sensors to emit a response due to the randomized sensor placement. Placing the BPD forms in the seat in the normal seating position will provide a starting point for tuning the alignment, or positioning, of the sensor assemblies 44. Thus, process step 204 allows for some adjustment of the initial placement of the sensor assemblies 44 so that the various BPD forms generally activate a differing number of sensors. It should be noted that process step 204 is used only to identify that the sensors are responding to seat cushion deflection and does not qualify the specific sensor responses. If a different number of sensors do not activate for each of the BPD forms, then an adjustment of the initial sensor placement may be called for. However, in certain circumstances, the seat designer/tuner may choose to have some sensor responses to certain BPD forms be the same as others at this point, if it is desired to have the quantitative sensor values distinguish the resultant detected patterns from the array in the later steps.

The resultant sensor outputs from the array are digitally stored in a known manner for reference. It should be appreciated that additionally, a variety of car seats for infants and toddlers are placed in the seat and belted down to derive the resultant detection by the sensor array. As previously mentioned, SRS airbag deployment suppression is important for front passenger seats in which a child seat, or a child's booster seat is in place. Therefore, the SRS system, and thereby the sensor array 45, must be tuned to also recognize when a child seat or booster seat is installed.

Once an initial sensor placement has been accomplished, process step 206 continues and the BPD forms are pressed into the seat in a predetermined series of varied seating positions to simulate "out-of-position" seating by each classification of occupants. This produces a like series of representative out-of-position sensor outputs from the array for each classification of occupants. This series of array outputs are digitally stored with the array outputs for the normal seating positions from process step 204. Process block 208 then performs a comparison of all the stored resultant sensor patterns and the results of the comparison are run through decision blocks 210, 212, and 214. Decision block 210 looks to see if any of the sensors never deflect. This tends to be indicative of a sensor placed such that it never receives any distributed weight in any of the seating positions for any of the occupant classifications. If this is true, the "Yes" path is followed to process block 216 in which the seat designer/tuner will modify the location of the non-deflecting sensor. The method steps continue by returning to process block 206 so that another pass of pressing the BPD forms into the seat is performed. Then, the comparison of the resultant sensor array outputs is again completed at process block 208 and decision block 210 again determines if any sensors do not deflect. This loop is continued through decision block 210 until all sensors deflect for at least one of the BPD forms and the "No" path is taken to decision block 212.

Decision block 212 determines if any one of the sensors always has the same relative deflection regardless of the BPD form or the placement of those forms in the various seating positions. This tends to be indicative of a sensor that may be non-functioning, or one placed so that it always receives the same amount of distributed weight, or one that is always fully deflected when any weight is in the seat. It should be appreciated that it may be desirable, based on the exact location of this sensor, to leave this sensor in its current position and provide quantitative tuning to it in the later portions of the method of the present invention. However, if this is not the case, then the "Yes" path is followed to process block 216 in which the seat designer/tuner may modify the location of the sensor. If the seat designer/tuner modifies the position of the sensor in process step 216, the method steps continue by returning to process block 206 so that another pass of pressing the BPD forms into the seat is performed. Then, the comparison of the resultant sensor array outputs is again completed at process block 208 and decision block 212 again determines if any sensors still always deflect to the same point. This loop is continued through decision block 212 until none of the sensors have a constant deflection for the different BPD forms. Once this is accomplished, the "No" path is taken to decision block 214.

Decision block 214 determines if any one of the sensors always has the same relative deflection as an adjacent sensor regardless of the BPD form or the placement of those forms in various seating positions. This tends to be indicative of a sensor placed too close to another so that it always receives the same distributed weight as its adjacent sensor. It should be further appreciated that it may be again desirable, based on the exact location of this sensor, to leave this sensor in its current position and provide quantitative tuning to it in the later portions of the method of the present invention. However, if this is not the case, then the "Yes" path is followed to process block 216 in which the seat designer/tuner may again modify the location of the same-deflecting sensor. The method steps continue by returning to process block 206 so that another pass of pressing the BPD forms into the seat is performed. Then, the comparison of the resultant sensor array outputs is again completed at process block 208 and decision block 214 again determines if any sensors do not deflect. This loop is continued through decision block 214 until all sensors have differing deflections for the BPD forms and then the "No" path is taken to the return block 218 to complete the method steps.

Once the tuning of the placement of the sensors is accomplished, where a generalized series of sensor array patterns has been produced for all the various BPD forms in the variety of seating positions and for the variety of child seat placements, the sensor array 45 will need to be tuned for operative pattern separation. In other words, once the overall placement of the sensors in the array is set, then the particular outputs of the individual sensors should be tuned so that the resultant patterns from the array are distinguishable one from another. This is accomplished by a second portion of the method of the present invention that is generally indicated at 240 in FIG. 5. It should be appreciated that this portion of the method of the present invention may be utilized separately from the previously discussed portion of tuning the sensor alignment. However, the tuning of the sensor outputs to provide distinguishable patterns relies heavily on a properly aligned array.

Figure 5:
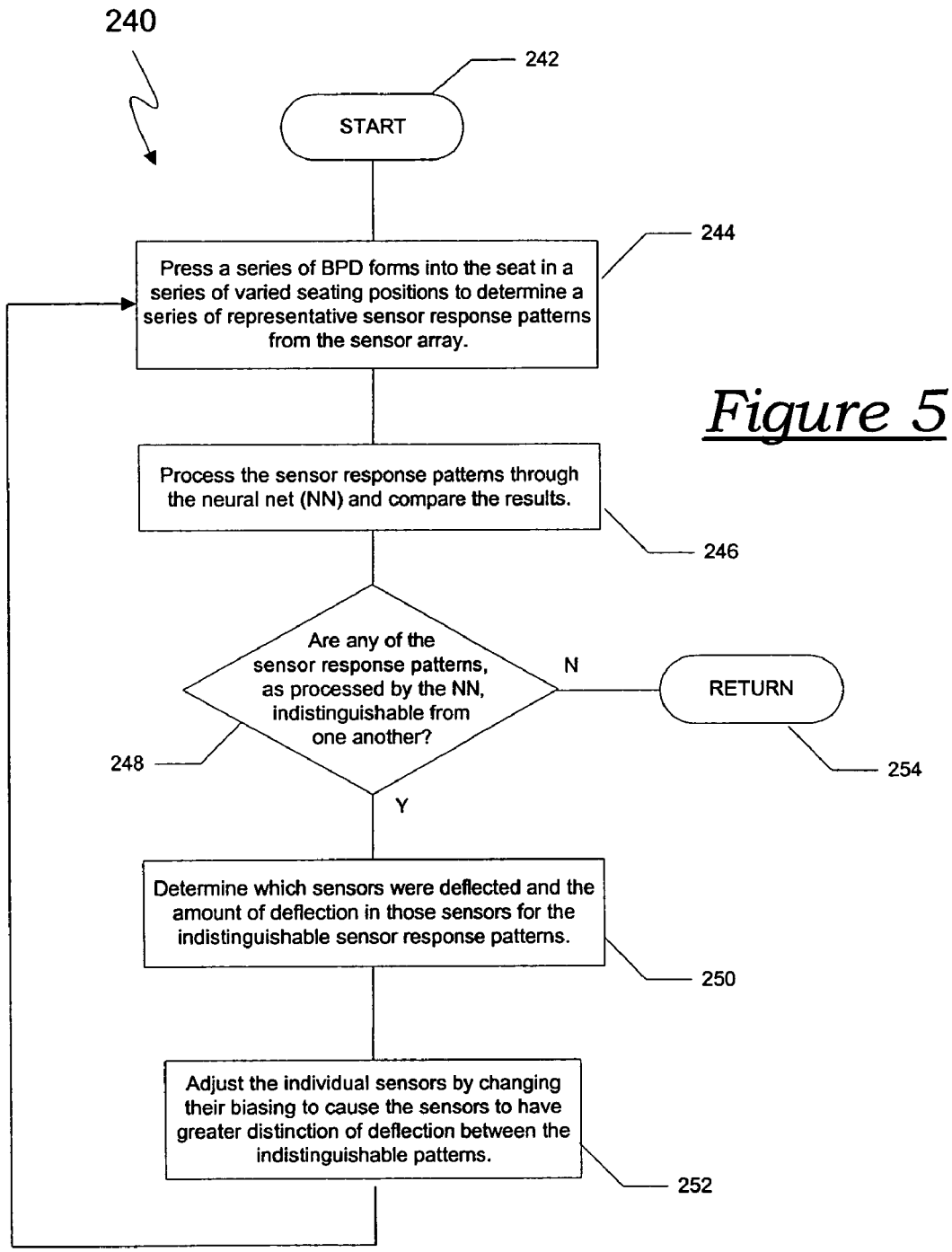
FIG. 5 is a block diagram flowchart of the method of the present invention for tuning the output of the sensors of the sensor array for a vehicle seat that is used with a neural net for occupancy classification.

In FIG. 5, since this portion of the method of the present invention tunes the output of a sensor array for a vehicle seat that is used with a neural net, the array must be electrically connected to the NN that is intended to be used with the seat. It should be appreciated that, although beyond the scope of this invention, it is necessary that some type of interface be established between the array and the NN, so that the analog data derived from the array can be preprocessed to provide digital information in the form that is understandable by the NN. Further, the data must be understandable as a series of representative seat occupancy patterns to the NN. A complete discussion of a NN of the type that may be employed with the vehicle seat occupancy sensing system disclosed herein is set forth in the co-pending application U.S. Ser. No. 10/748,504, entitled "Method Of Pattern Recognition And Occupancy Classification In A Vehicle Seat" and filed Dec. 30, 2003. The disclosure of this application is incorporated herein by reference.

The method begins at the start entry block 242 and moves to process block 244 in which the series of seat cushion body pressure distribution (BPD) forms are pressed into the particular seat in a series of predetermined seating positions to produce a series of representative sensor response patterns from the sensor array. As in the previously described method steps, the series of predetermined seating positions used in step 244 more specifically includes forward facing "normal" seating positions, a variety of "out-of-position" seating positions, and the placement of a variety of child seats. The patterns are digitally stored in a database so that at process block 246 the sensor response patterns are sent through the NN and the results are compared to each other. Decision block 248 then checks to determine if any of the sensor response patterns, as processed by the NN, are indistinguishable from one another.

If any of the sensor response patterns are found to be indistinguishable in the neural net, the "Yes" path is taken to process block 250 which determines which sensors were deflected and the amount of deflection in those sensors for the indistinguishable sensor response patterns. This identifies which particular sensors in the indistinguishable patterns may need adjustment. It should be appreciated that in the sensor response patterns that are found to be indistinguishable by the neural net some, all, or only a few sensors actually have the same output value, but they may simply be close enough within the sensing tolerances of the neural net that the overall patterns seem the same. For example, if it is desirable to distinguish between the sensor response patterns generated by the BPD forms representative of an average 6-year old child and that of a small female figure (typically referred to as a $5^{th}$ percentile female) it is notable that the weight distribution actually differs across the seat for the same body weight. Thus, although the weight is the same, the spread of the weight across the seat surface is narrower for the 6-year old child. To an un-tuned sensor array, this small distinction of how the weight distributes across the seat may be sensed, but not presented to the INN in a manner in which the NN can distinguish. For example, if un-tuned, the sensors located just beyond the actual displaced seating area occupied by the 6-year old may inadvertently deflect a small amount which appears similar to the deflection of these sensors when the seat is occupied by a $5^{th}$ percentile female form. In this case, the SRS would be improperly triggered to deploy by the control system in the event of a collision. Even more importantly is the opposite type of scenario, where a $5^{th}$ percentile female, seated in a normal forward facing position, moves "out-of-position" in the seat. In this case, an un-tuned array of sensors may be "fooled" into reclassifying the seat as now occupied by a 6-year old, which would improperly cause the SRS to suppress deployment for the $5^{th}$ percentile female. The method of the present invention tunes the sensor array to avoid inadvertent deployment and improper suppression of the SRS.

More specifically, once process block 250 determines which sensors appear to be causing the NN to be unable to distinguish between the particular sensor response patterns, the method continues to process block 252. In process block 252, the seat designer/tuner will adjust the individual sensors by changing their internal biasing to cause the sensors to diverge and have greater distinction of sensor deflection between the indistinguishable patterns. To continue the above example, the seat designer/tuner may increase the biasing force of the sensors that are located just beyond the actual displaced seating area occupied by the 6-year old, making them slightly more resistant to weight placed on them. In this case, any inadvertent deflection of these sensors by the 6-year old would be more readily distinguished from the intentional deflection of these sensors caused by the weight of the $5^{th}$ percentile female. It should be appreciated that the adjustments made to the individual sensors, at the discretion of the seat designer/tuner, may be made in small, incremental stages or as a more substantial singular attempt to distinguish the sensor response patterns.

Regardless, to verify the changes in the sensor response patterns whenever an adjustment is made to the individual sensors in process block 252, the process path of the method goes back to process block 244. Thus, the placement of the various BPD forms in the various seating positions is repeated. Decision block 246 again compares the resultant sensor response patterns through the NN to determine if the same or any other patterns are indistinguishable. This is necessary because any biasing adjustment made to the individual sensors to cause the NN to distinguish between two particular sensor response patterns may have inadvertently caused an indistinguishable condition between two other previously distinguishable patterns. In this manner, the method provides for a repetitive process of identifying those sensor response patterns that are indistinguishable by the NN and adjusting the biasing of the individual sensors until decision block 248 is satisfied and the "No" path is taken to the end-completion block 254.

It should be appreciated that the adjustment or change to the biasing of the individual sensors may be accomplished in a number of ways and may depend on the structure of the sensor itself. First, the sensors of the array may employ a constant biasing rate where the rate is constant throughout the deflection of the sensor. On the other hand, the sensors may employ a variable biasing rate, or the array may be composed of a mix of constant rate and variable rate biased sensors. Secondly, the biasing rate of the individual sensors may be changed in a manner to increase or decrease their deflection responsiveness to certain weight loading. However, the biasing rate cannot be lowered to the point at which the sensor becomes too weak to overcome the hysteresis of the foam and cushioning material of the seat, thereby being unable to return to its non-deflected position during "empty seat" conditions.

Additionally, it may be beneficial to change between the types of biasing (constant rate or variable rate) for an individual sensor in the array. It should be appreciated that the repetitive nature of this method provides the ability to provide good separation between the sensor response patterns for the various BPDs and child seats used to tune the sensors. It should be further appreciated that if, in the future, it is deemed necessary to separate the currently defined occupant classifications into additional groups or sub-categories, the present invention will continue to provide a method to tune a NN sensor array to make those distinctions. In this manner, with an sensor array tuned by the method of the present invention, the NN of the SRS system will operationally be capable of distinctly determining a physical presence in a vehicle seat as belonging to a particular occupancy classification regardless of its seating position in the seat. Thus, the method of the present invention overcomes the drawbacks and the limitations of the prior art by providing a tuning method for a sensor array used with a NN in an SRS system that allows the NN to distinguish between all the various occupant classification and their placement in the seat.

The invention has been described in an illustrative manner. It is to be understood that the terminology which has been used is intended to be in the nature of words of description rather than of limitation. Many modifications and variations of the invention are possible in light of the above teachings. Therefore, within the scope of the claims, the invention may be practiced other than as specifically described.

We claim:

1. A method of tuning the output of a sensor array for a vehicle seat occupancy sensing system that is used with a neural net for occupancy classification, said method including the steps of:

pressing a series of seat cushion body pressure distribution forms in a series of predetermined seating positions into a particular vehicle seat to produce a series of representative sensor response patterns from the sensor array;

comparing each sensor response pattern through the neural net to determine if any of the sensor response patterns are indistinguishable from one another;

determining which sensors were deflected and the amount of deflection in those sensors for the indistinguishable sensor response patterns;

adjusting the biasing of said sensors to cause said indistinguishable patterns to diverge and be distinguishable by the neural net; and repeating the above steps until the sensor response patterns are distinguishable from one another.

2. A method as set forth in claim 1 wherein the method step of pressing a series of seat cushion body pressure distribution forms into a particular vehicle seat to produce a series of representative sensor response patterns from the sensor array further includes the step of securing a predetermined variety of child seats and child booster into the vehicle seat to produce an additional series of representative sensor response patterns for these items.

3. A method as set forth in claim 1 wherein the method step of adjusting the biasing of said sensors to cause said indistinguishable patterns to diverge and be distinguishable by the neural net further includes the step of changing the biasing members of said sensor to increase the biasing force opposing the weight placed in the vehicle seat.

4. A method as set forth in claim 1 wherein the method step of adjusting the biasing of said sensors to cause said indistinguishable patterns to diverge and be distinguishable by the neural net further includes the step of changing the biasing members of said sensor to decrease the biasing force opposing the weight placed in the vehicle seat.

5. A method as set forth in claim 1 wherein the method step of adjusting the biasing of said sensors to cause said indistinguishable patterns to diverge and be distinguishable by the neural net further includes the step of changing the biasing members of said sensor from a constant spring rate biasing member to a variable spring rate biasing member.

6. A method as set forth in claim 1 wherein the method step of adjusting the biasing of said sensors to cause said indistinguishable patterns to diverge and be distinguishable by the neural net further includes the step of changing the biasing members of said sensor from a variable spring rate biasing member to a constant spring rate biasing member.

7. A method of tuning the alignment of a sensor array for a vehicle seat occupancy sensing system that is used with a neural net for occupancy classification, said method including the steps of:

locating a plurality of sensors in the form of an array so as to have a differing number of sensors activated by each of a series of different predetermined seat cushion body pressure distribution forms when placed in the particular vehicle seat in a normal seating position;

pressing the series of different seat cushion body pressure distribution forms in a predetermined series of varied seating positions into the particular vehicle seat to produce a series of representative sensor response patterns from the sensor array;

comparing said sensor response patterns to determine if the output of any of the sensors can be categorized as one of a group that includes, never deflected regardless of occupant classification and seating position used, always at same deflection regardless of occupant classification and seating position used, and always at same deflection as an adjacent sensor;

modifying the location of a sensor in the array if the output of the sensor can be categorized as one in the above defined group so that its deflection varies for at least one seating position in at least one occupant classification; and repeating the above steps until none of the sensors can be defined as belonging to one of the above categories.

8. A method as set forth in claim 7 wherein the method step of modifying the location of a sensor in the array if the output of the sensor can be categorized as one in the above defined group, further includes the step of removing a sensor from the array if it can be categorized as never deflected regardless of occupant classification and seating position used.

9. A method as set forth in claim 7 wherein the method step modifying the location of a sensor in the array if the output of the sensor can be categorized as one in the above defined group, further includes the step of verifying that the sensor is operational if it can be categorized as always at same deflection regardless of occupant classification and seating position used.

10. A method of tuning the output of a sensor array for a vehicle seat occupancy sensing system that is used with a neural net for occupancy classification, said method including the steps of:

pressing a series of seat cushion body pressure distribution forms in a series of predetermined seating positions into a particular vehicle seat to produce a series of representative sensor response patterns from the sensor array;

securing a predetermined variety of child seats and child booster into the vehicle seat to produce an additional series of representative sensor response patterns for these items;

comparing each sensor response pattern through the neural net to determine if any of the sensor response patterns are indistinguishable from one another;

determining which sensors were deflected and the amount of deflection in those sensors for the indistinguishable sensor response patterns;

adjusting the biasing of said sensors to cause said indistinguishable patterns to diverge and be distinguishable by the neural net by changing the biasing members of said sensor to increase the biasing force opposing the weight placed in the vehicle seat; and repeating the above steps until the sensor response patterns are distinguishable from one another.

* * * * *